United States Patent [19]

Hosoya et al.

[11] Patent Number: 5,331,675

[45] Date of Patent: Jul. 19, 1994

[54] APPARATUS AND A METHOD FOR HANDLING A CONTROL ROD

[75] Inventors: Kiyokazu Hosoya, Mito; Toshihiro Kodama; Takahiro Konno, both of Hitachi, all of Japan

[73] Assignee: Hitachi, Ltd., Tokyo, Japan

[21] Appl. No.: 110,979

[22] Filed: Aug. 24, 1993

[30] Foreign Application Priority Data

Aug. 31, 1992 [JP] Japan ................................. 4-232261

[51] Int. Cl.⁵ ............................................. G21C 19/00
[52] U.S. Cl. ..................................... 376/260; 376/233
[58] Field of Search ............... 376/260, 233, 262, 353, 376/362

[56] References Cited

U.S. PATENT DOCUMENTS

| | | | |
|---|---|---|---|
| 4,904,443 | 2/1990 | Carruth | 376/260 |
| 5,241,570 | 8/1993 | Challberg | 376/260 |

FOREIGN PATENT DOCUMENTS 56-103399 8/1981 Japan .
2-205795 8/1990 Japan .

Primary Examiner—Daniel D. Wasil
Attorney, Agent, or Firm—Antonelli, Terry, Stout & Kraus

[57] ABSTRACT

A control rod handling apparatus and method for exchanging a control rod connected to a control rod drive mechanism by a bayonet coupling. The control rod handling apparatus comprises a member or connection to a fuel exchange apparatus, a fixing part having guides to be seated at the top face of an upper grid plate in a reactor vessel and to e supported by the upper rid plate, a body provided at the lower part of the fixing part, a control rod handling part having a control rod grasping instrument provided at the bottom part of the body, a fuel support piece handling part having a fuel support piece grasping instrument and means for positioning the fuel support piece grasping instrument, which is provided outside the control rod handling part, means for vertically moving the fuel support piece handling part along with the outside of the control rod handling part, and means for rotating the control rod handling part, the fuel support piece handling part, and the means for vertical motion.

6 Claims, 17 Drawing Sheets

APPARATUS AND A METHOD FOR HANDLING A CONTROL ROD

BACKGROUND OF THE INVENTION

(1) Field of the Invention

The present invention relates to an apparatus and a method for control rod exchange work during the regular inspection of a nuclear power plant using a boiling water reactor (referred to BWR), and more particularly an apparatus and a method for attaching or taking off a control rod (referred to CR), and for easily handling a fuel support piece (referred to FS).

(2) Description of the Prior Art

Conventionally, the spud coupling is used for connecting a CR and a control rod drive mechanism (referred to CRD) in a BWR. In the CR exchange work, such fittings as described in Japanese Patent Laid-Open No. 103399/1981 were presented.

However, in a BWR where the above-mentioned spud coupling is adapted, there is the possibility that the connection between a CR and a CRD is disconnected for some reason during plant operation. If such disconnection takes place during plant operation, normal power control become impossible and it is needed to shut down the plant operation.

The bayonet coupling is a way solving the above-mentioned problem of the CR-CRD disconnection. In the work of exchanging a CR to which the bayonet coupling is applied, a coupling socket, namely, a CR must be rotated by a predetermined angle for disconnecting the connection. Then, it is necessary to provide an apparatus for rotating a CR in the work of exchanging a CR to which the bayonet coupling is applied. A method for exchanging a CR to which the bayonet coupling is applied was proposed in Japanese Patent Laid-Open No. 205795/1990. In this method, after a FS is taken out above the upper grid plate by using an exclusive handling equipment for a FS, the CR is grasped by use of a CR handling apparatus attached to a fuel exchange apparatus, disconnected from the CRD by rotation and taken out above the upper grid plate by a subsidiary hoist of a fuel exchange apparatus. In attaching a new CR, the CR is connected to the CRD by using the above-mentioned CR handling apparatus in reverse procedures to the above-mentioned procedures and the FS is attached to a reactor core support plate by using an exclusive handling equipment for a FS. This prior art premises that the FS is taken out by the exclusive handling equipment for a FS. Therefore, in applying the prior art, many steps such as attaching or taking off the exclusive handling equipment for a FS and the CR handling apparatus to or from the subsidiary hoist, winching up or down the exclusive handling equipment for a FS and the control rod handling apparatus into or out of the reactor core and so forth are needed, which brings about much time consuming work.

SUMMARY OF THE INVENTION

(1) Objects of the Invention

The present invention has been achieved in the consideration of the above-described problems, and is aimed at providing an apparatus and a method which can shortening the time for exchanging a CR by disconnecting or coupling a CR and a CRD, and taking out or in a CR and a FS continuously.

(2) Method Solving the Problem

A CR handling apparatus of the present invention for disconnecting or coupling the CR and the CRD using the bayonet coupling, comprises a member for connection attached to a fuel exchange apparatus, a fixing part having guides to be seated at the top face of an upper grid plate in a reactor vessel and to be supported by the upper grid plate, a CR handling part having a CR grasping instrument, a FS handling part having a FS grasping instrument, a means for vertically moving the FS handling part and a means for rotating the CR handling part, the FS handling part and the means for vertically moving the FS handling part.

The first method for disconnecting the CR and the CRD by using the above-mentioned CR handling apparatus, comprises the steps of getting down the CR handling apparatus attached to the fuel exchange apparatus, seating the fixing part at the upper grid plate, lowering the FS handling part, seating the bottom part of the FS handling part at the top face of the FS, positioning the FS handling part, grasping the FS and lifting the FS above the upper grid plate, grasping the CR, rotating the CR handling part grasping the CR and the FS handling part grasping the FS by a predetermined angle, disconnecting the connection between the CR and the CRD, and taking out the CR and the FS from the reactor core.

And the first method for coupling the connection between the CR and the CRD by using the above-mentioned CR handling apparatus comprises the steps of the reverse procedures to the above-mentioned first method for disconnecting the connection between the CR and the CRD.

And the second method for disconnecting the CR and the CRD by using the above-mentioned CR handling apparatus, comprises the steps of getting down the CR handling apparatus attached to the fuel exchange apparatus, seating the fixing part at the upper grid plate, lowering the FS handling part, seating the bottom part of the FS handling part at the top face of the FS, positioning the FS handling part, grasping the FS and lifting the FS above the top part of the CR, grasping the CR, disconnecting the connection between the CR and the CRD by rotating the CR handling part grasping the CR and the FS handling part grasping the FS by a predetermined angle, lifting the FS handling part by the position right below the upper grid plate, rotating the CR handling part and the FS handling part reversely to the above-mentioned rotation by the predetermined angle, and taking out the CR and the FS from the reactor core.

And the second method for coupling the CR and the CRD by using the above-mentioned CR handling apparatus comprises the steps of the reverse procedures to the above-mentioned second method for disconnecting the connection between the CR and the CRD.

BRIEF DESCRIPTION OF THE DRAWINGS

FIG. 19(a) is a figure in the case that the fuel support piece is positioned in the original direction and FIG. 19(b) is a figure in the case that the fuel support piece is rotated by 45 degrees.

DETAILED DESCRIPTION OF THE EMBODIMENTS

Hereinafter, details of the present invention is explained based on embodiments by referring to drawings.

Figure 1:
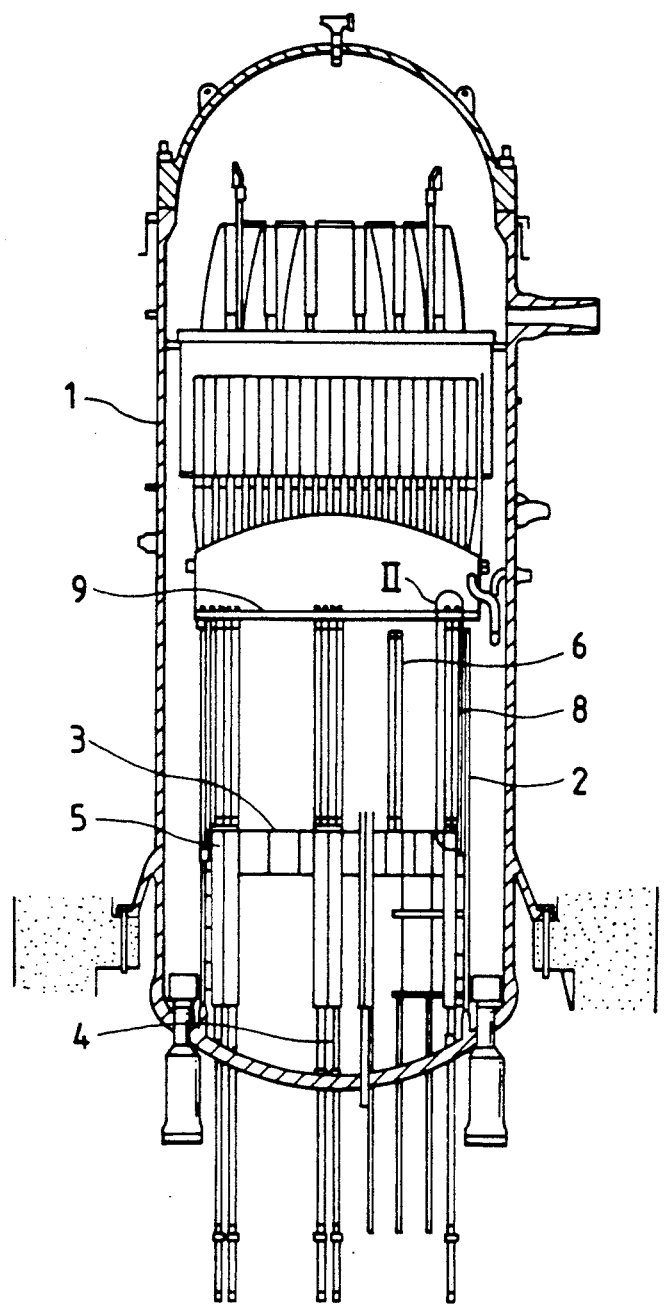
FIG. 1 is a sectional view showing the internal constitution of a reactor vessel.
Figure 2:
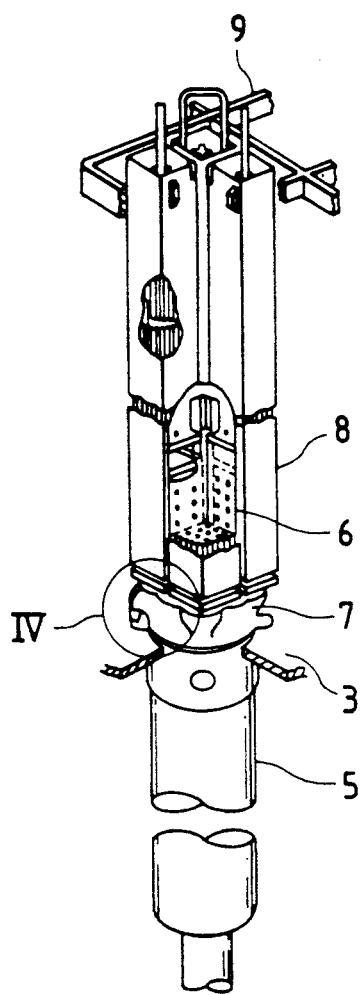
FIG. 2 is a bird's-eye view of part II in FIG. 1.
Figure 4:
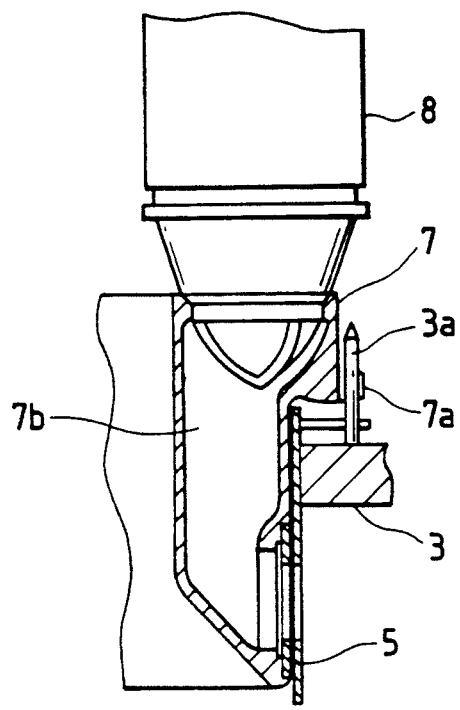
FIG. 4 is an enlarged view of part IV in FIG. 2, FIG. 5(a) and 5(b) are drawings of the bayonet coupling structure.
Figure 3:
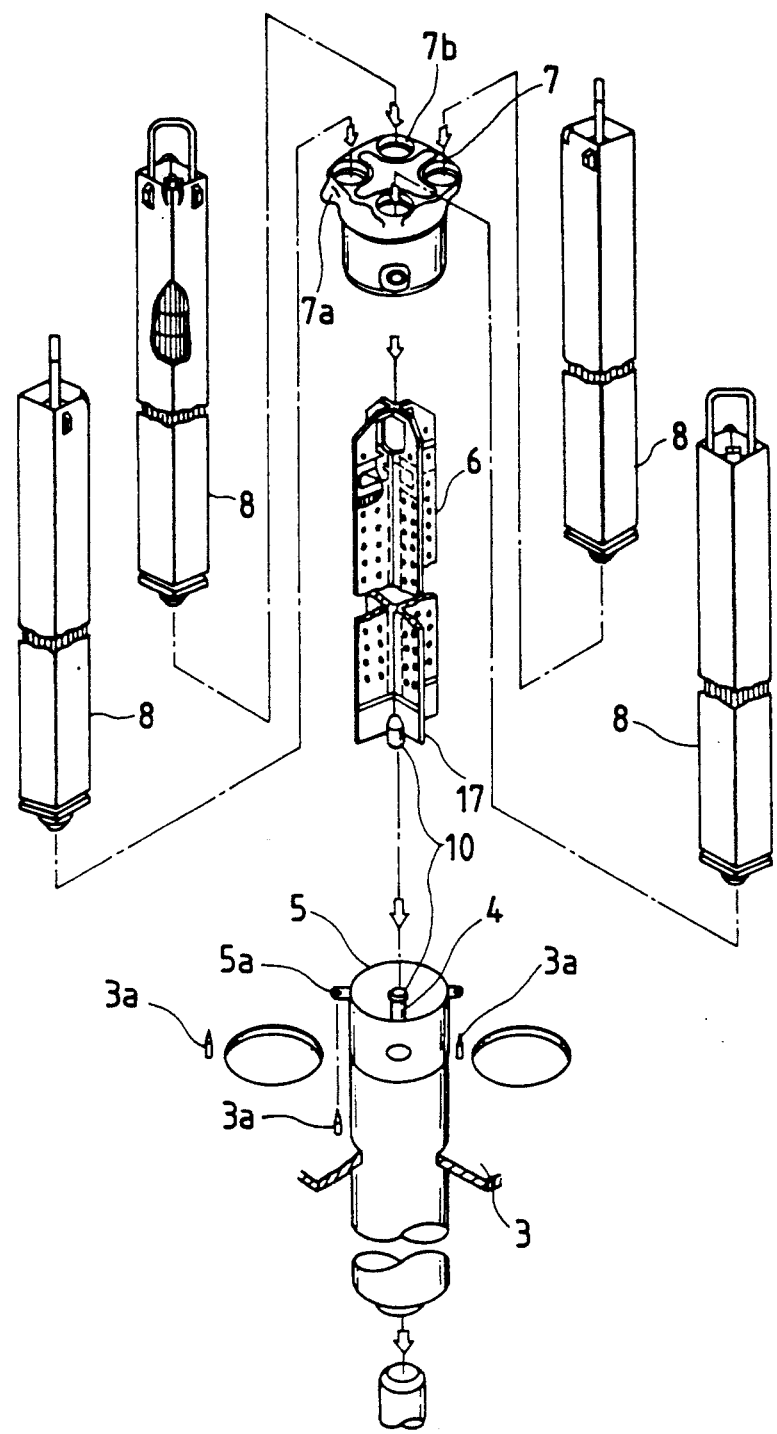
FIG. 3 is an assembling drawing of fuel assemblies, a control rod, a control rod drive mechanism, a fuel support piece and so forth.

First, the constitution of a reactor core comprising fuel assemblies 8, a CR 6, a CRD 4 and a FS 7 in a reactor vessel is explained. FIG. 1 shows the internal constitution in the reactor vessel of a BWR, FIG. 2 is a bird's-eye view of part II in FIG. 1, FIG. 3 is an assembling drawing of the fuel assemblies 8, the CR 6, the CRD 4 and the FS 7, and FIG. 4 is an enlarged view of part IV in FIG. 2 which is shown partially by a sectional view. As shown in FIG. 1, in a BWR, constitution components are installed in the reactor vessel 1. A reactor core support plate 3 is fixed to a reactor core shroud 2 constructed with the reactor vessel 1 in a body. The CRD 4 is provided in the bottom part of the reactor vessel 1. As shown in FIG. 2 and FIG. 3, a CR guide tube 5 is provided above the CRD 4, projecting above the reactor core support plate 3, fixed by engaging pins 3a provided on the reactor core support plate 3 into connection holes 5a of the control guide tube 5. In the CR guide tube 5, the CR 6 having cruciform section is connected to the top of the CRD 4 by the bayonet coupling as shown in FIG. 5(a) and 5(b), FIG. 6(a), 6(b), 6(d) and 6(e), and in the upper part of the CR guide tube 5, the FS 7 for supporting four fuel is fixed by engaging the pins 3a into connection holes assemblies 8 is provided. As shown in FIG. 4, the FS 7 7a for preventing the FS 7 from rotating. The fuel assemblies 8 are positioned by inserting the bottom part of the fuel assemblies 8 into holes for fuel support 7b and the top parts of the fuel assemblies 8 are fixed by the upper grid plate 9.

Figure 5A:
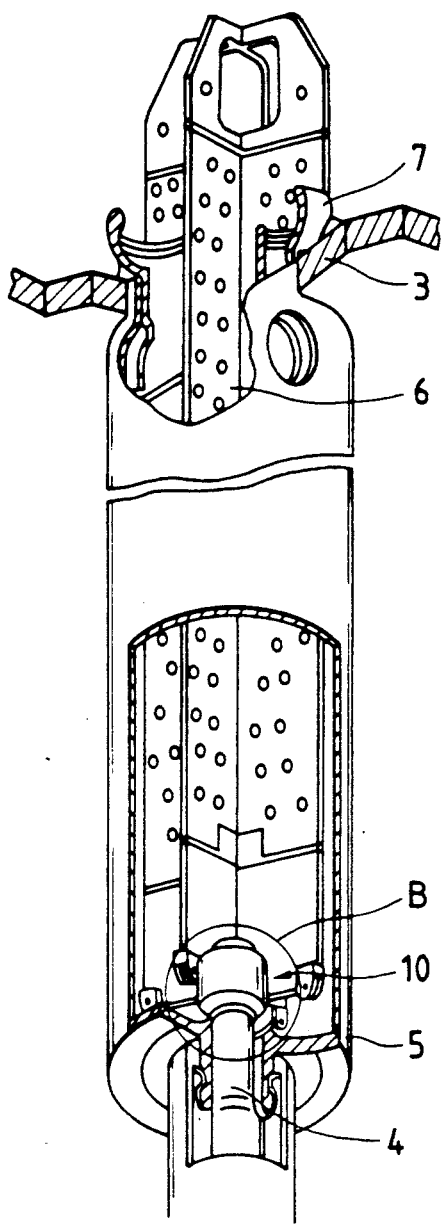
FIG. 5(a) is a bird's-eye view of the connection part and FIG. 5(b) is a partially enlarged view of part B in FIG. 5(a), FIG. 6(a)–6(f) are drawings indicating procedures of disconnecting the bayonet coupling.
Figure 5B:
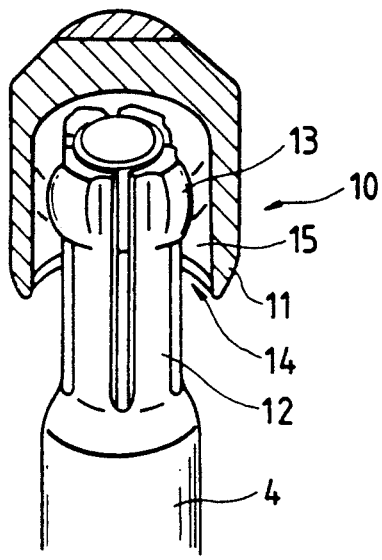
Figure 6A:
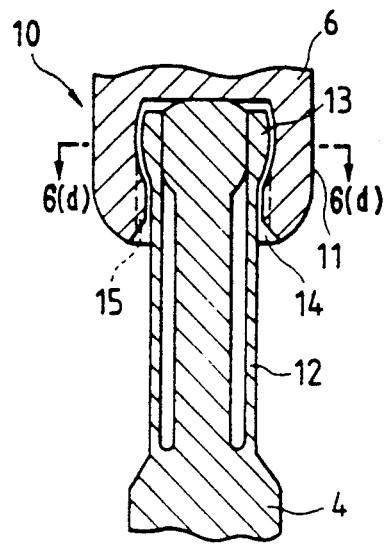
FIG. 6(a)–6(c), are vertical sections of the bayonet coupling.
Figure 6B:
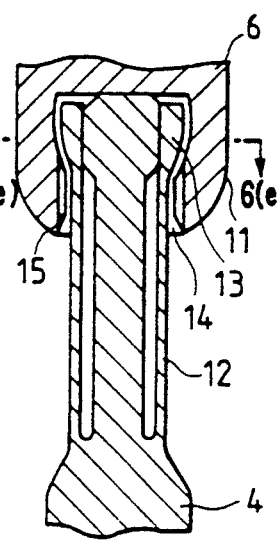
Figure 6C:
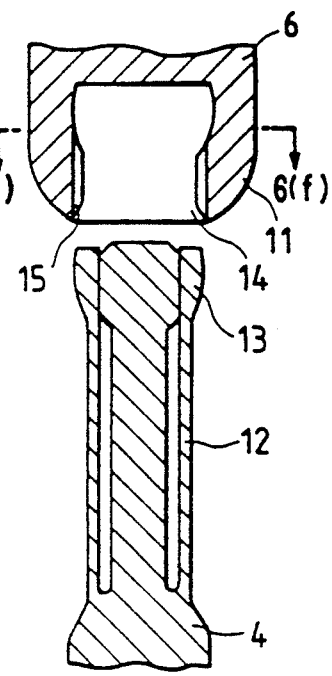
Figure 6D:
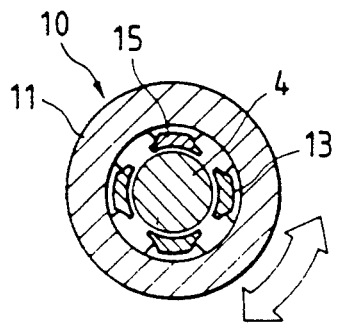
FIG. 6(d)–6(f) are cross sections of FIG. 6(a)–6(c), respectively.
Figure 6E:
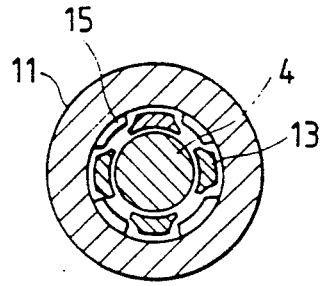
Figure 6F:
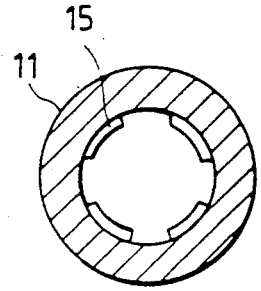

Next, the constitution of the bayonet coupling 10 for connecting the CR 6 and the CRD 4 is explained. FIG. 5(a) and 5(b) show the constitution of the bayonet coupling, FIG. 5(a) is a bird's-eye view of the connection part and FIG. 5(b) is an enlarged view of the part B in FIG. 5(a). FIG. 6(a)–6(f) show the procedures for disconnecting the bayonet coupling 10, FIG. 6(a), 6(b) and 6(c) are vertical sectional views of the bayonet coupling, and FIG. 6(d), 6(e) and 6(f) are a D—D sectional view of FIG. 6(a), a E—E sectional view of FIG. 6(b) and a F—F sectional view of FIG. 6(c), respectively. As shown in FIG. 6(a) and 6(b), the bayonet coupling 10 consists of a coupling socket 11 provided at the bottom of the CR 6 and a coupling spud 12 provided at the top of the CRD 4. Convex parts 13 are arranged by 90 degrees of interval in the circumferential direction at the upper part of the coupling spud 12 and convex parts 15 are arranged by 90 degree of intervals at the inside face of the coupling socket 11. As shown in FIG. 6(b) and 6(e), the connection of the convex parts 13 and 15 is disconnected by rotating the coupling socket 11 by 45 degrees.

Figure 7:
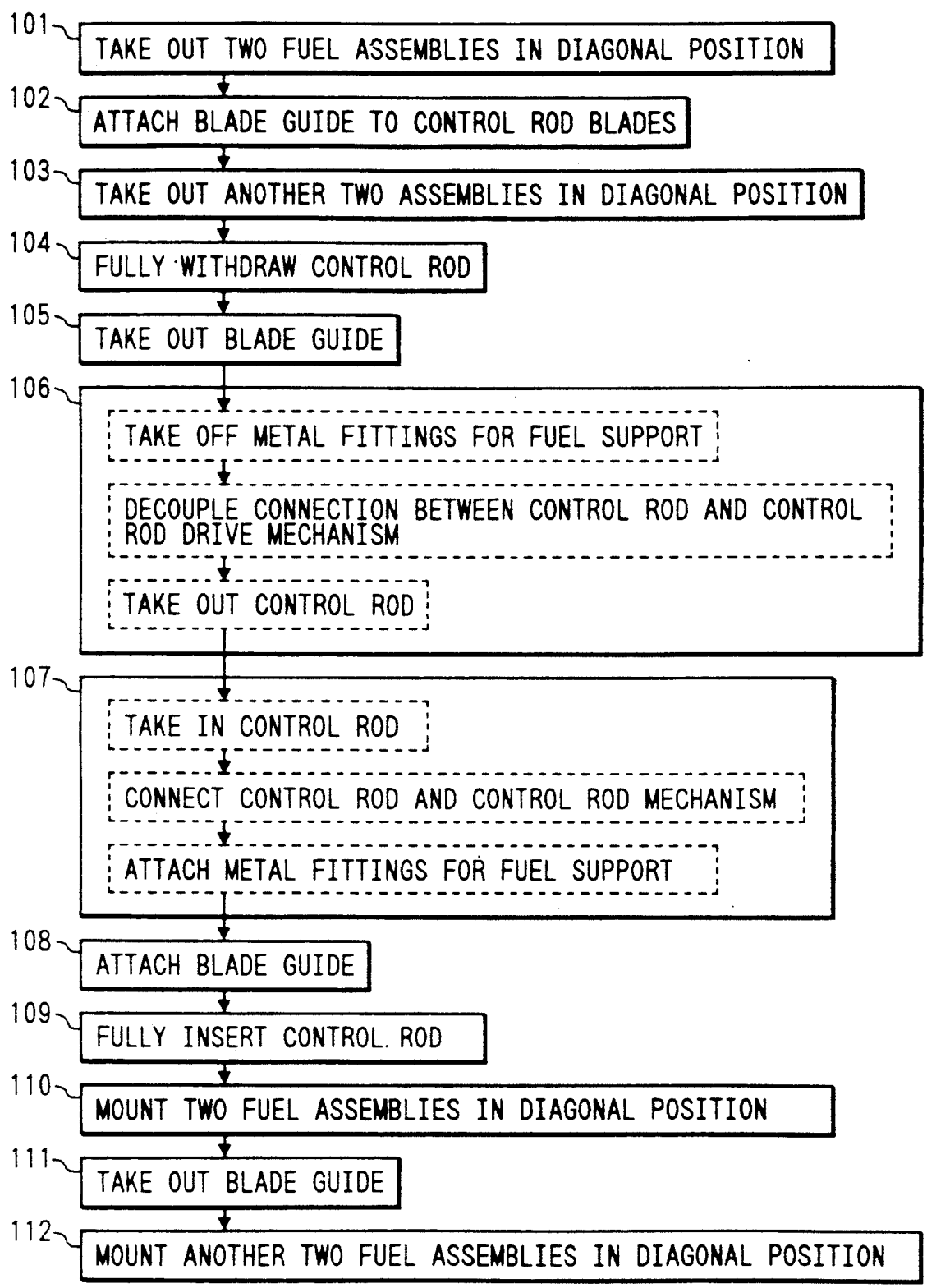
FIG. 7 is a flow chart showing procedures of exchanging the control rod by control rod handling methods of embodiments based on the present invention.
Figure 8:
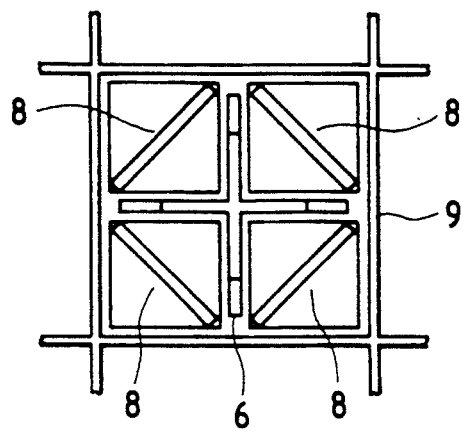
FIG. 8(a)–8(e) are plane figures of a upper grid plate viewed from above, and FIG. 8(a)–8(e) correspond to the procedures in FIG. 7 from the step 101 for taking out the fuel assemblies to the step 105 for taking out a control rod blade guide.
Figure 8:
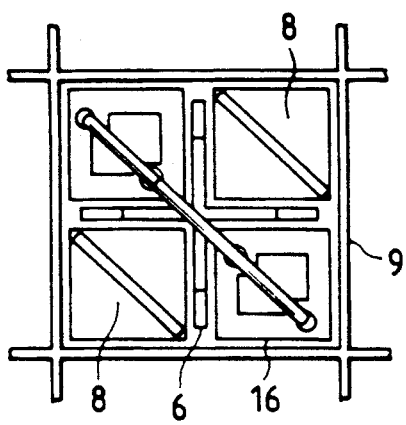
Figure 8:
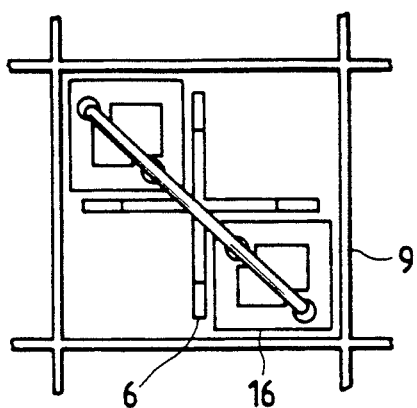
Figure 8:
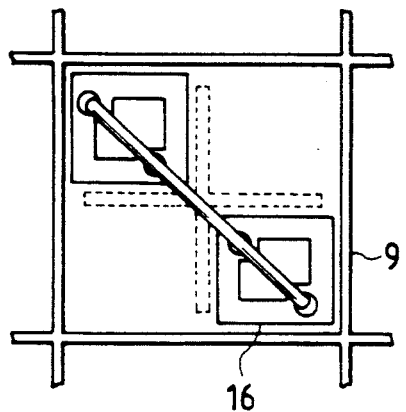
Figure 8:
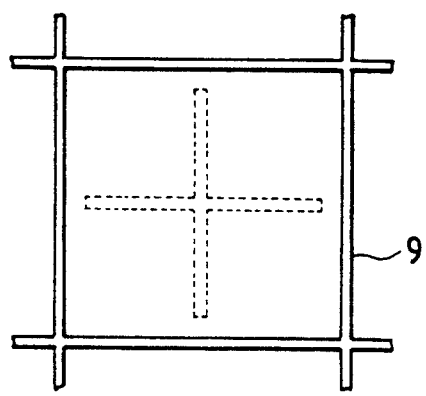

Next, the procedures for control rod exchanging is explained by referring to FIG. 7. The steps 101–112 of FIG. 7 indicate each procedure for exchanging the control rod. FIG. 8(a)–8(e) are drawings of the upper grid plate 9 viewed from above and correspond to the steps from the step 101 of taking out the fuel assemblies 8 to the step 105 of taking out control rod blade guides 16, respectively. Coupling and disconnecting the bayonet coupling 10 are implemented after fully withdrawing the CR 6 downward. After the step 105, the step 106 for taking off the CR 6 and the step 107 for mounting the CR 6 are implemented. Conventionally, the three sub-steps in the dotted line box of each step 106 and 107 are not continuously implemented and the independent procedure is needed for implementing each of the three sub-steps. Especially, for the tasks for taking off the FS 7 and the CR 6, the tasks of attaching or taking off the exclusive equipment for the FS 7 or the CR 6 and the tasks of getting down or lifting the exclusive equipment are needed in the sub-steps. On the other hand, by using the apparatus and the method for handling the CR 6 of the present invention, the three sub-stages in each of the steps 106 and 107 are continuously implemented as a step.

Figure 9:
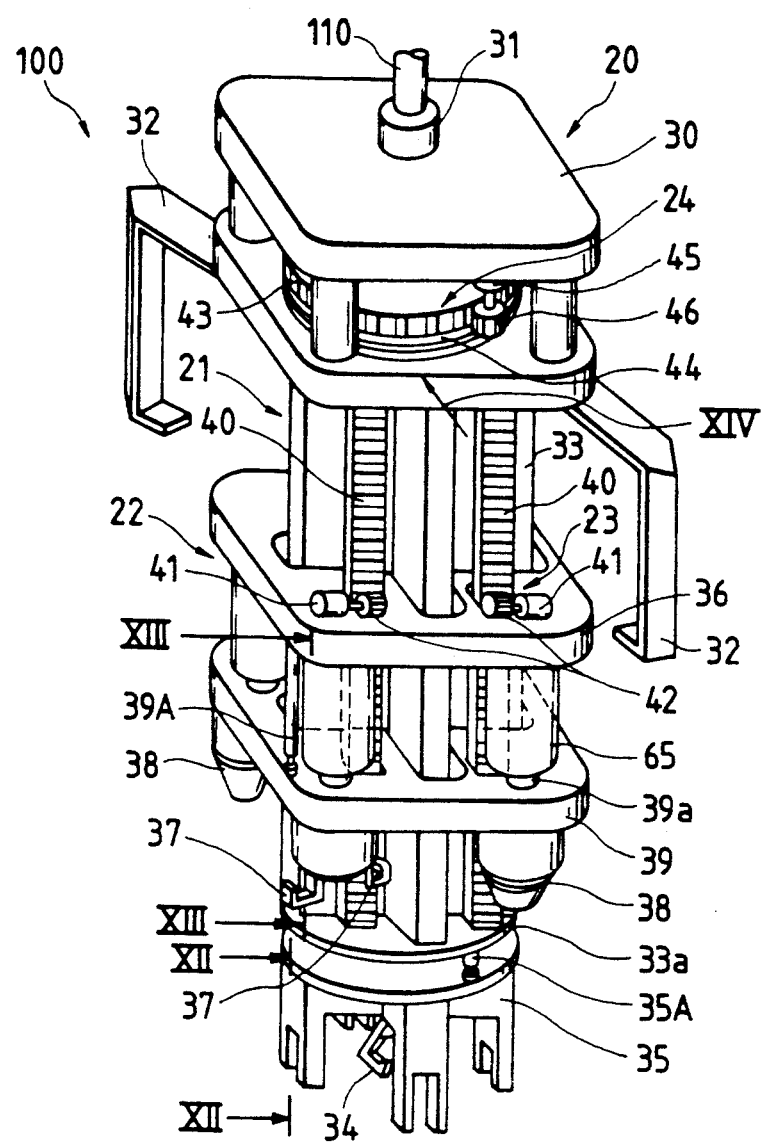
FIG. 9 is a bird's-eye view showing constitution of a control rod handling apparatus of an embodiment based on the present invention.
Figure 10:
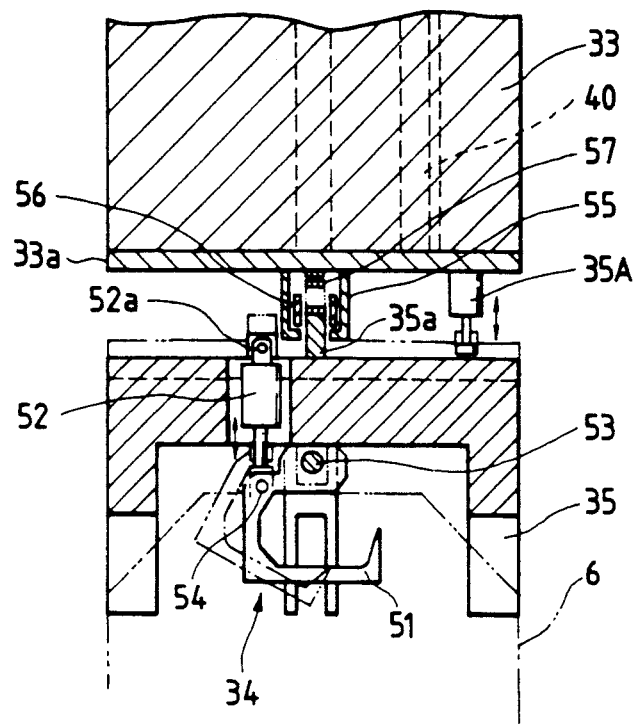
FIG. 10 is a sectional view of a control rod grasping instrument in XII—XII direction of FIG. 9.
Figure 11:
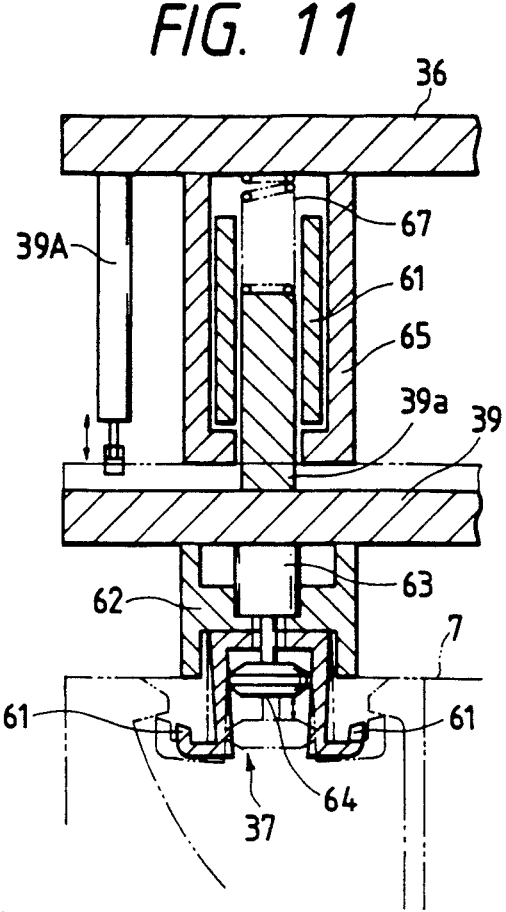
FIG. 11 is a sectional view of a fuel support piece grasping instrument in XIII—XIII direction of FIG. 9.
Figure 12:
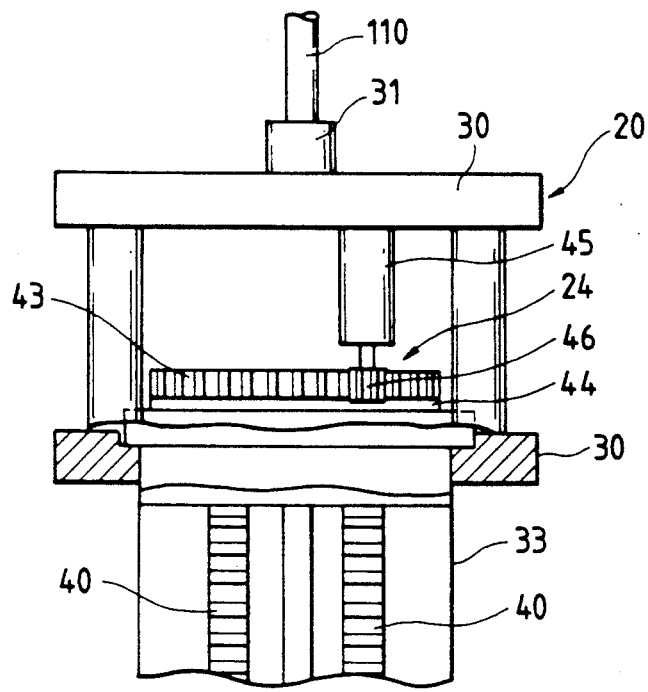
FIG. 12 is a side view of the upper part of the control rod handling apparatus in XIV direction.

Next, the constitution of the control rod handling apparatus as an embodiment of the present invention is explained by referring to FIG. 9–12. FIG. 9 shows the constitution of the control rod handling apparatus of the embodiment. The control rod handling apparatus 100 comprises a fixing part 20, a CR handling part 21, a FS handling part 22, a vertically moving part 23 and a rotating part 23 of which functions are mentioned after. The fixing part 20 having dual constitution comprises a body 30 of the fixing part 20 inside which a rotating part 24 is provided, a member for connection 31 provided at the top face of the body 30 and attached to a wire rope 110 hanging from the subsidiary hoist of the fuel exchange apparatus not shown in a figure, and guides 32 provided at the bottom face of the body 30 to be seated at the top face of the upper grid plate 9 and to be supported by the upper grid plate 9 for preventing the control rod handling apparatus 100 from rotating. The CR handling part 21 provided at the bottom part of the fixing part 20 and having the same cruciform section as the CR 6, comprises a CR handling body 33 at the bottom of which a disk 33a is provided, a CR grasping instrument 34 provided at the bottom of the disk 33a for grasping the CR 6, a member 35 for detection of seating of the CR handling part 21 at the CR 6 to detect seating of the CR handling part 21 at the top of the CR 6 fully withdrawn and a sensor 35A for detection of seating of the CR handling part 21 at the CR 6 provided at the bottom face of the disk 33a. As shown in FIG. 10 by the sectional view in XII—XII direction of FIG. 9, the CR grasping instrument 34 comprises a CR hook 51 supported by a pin 53 in the center of the bottom face of the member 35 for detection of seating of the CR handling part 21 at the CR 6 and an air cylinder 52 connected to the top face of the member 35 by a pin 54. The CR hook 51 is connected to the bottom of the air cylinder 52 and grasps the CR 6 by revolving on the fulcrum of the pin 53 by the action of the air cylinder 52. The member 35 for detection of seating of the CR handling part 21 at the CR 6 comprises the disk form upper part and the cruciform lower parts the four bottoms of which are nicked for positioning the CR handling part 21 to the CR 6. The member 35 for detection of seating of the CR handling part 21 at the CR 6 is connected to the disk 33a at the bottom of the CR handling body 33 by engaging the projection part 35a at the top of the member 35 into a connection cover 55 and has ability of some up-and-down motion by a bush 56 and a spring 57. When the member 35 for detection of seating of the CR handling part 21 at the CR 6 is seated at the CR 6, the member 35 is pushed up and the projection part 35a goes up inside the connection cover 55 as pushing the spring 57. At the same time, the top face of the member 35 pushes the tip of the sensor 35A for detection of seating of the CR handling part 21 at the CR 6 which generates a signal of seating of the CR handling part 21 at the CR 6. A circuit not shown in a figure confirms that the CR handling part 21 is seated at the CR 6 by accepting the signal. The FS handling part 22 comprises a FS handling body 36 having a cruciform hole in its center so that the CR handling body 33 penetrates the hole and the FS handling part 22 can move vertically outside the CR handling body 33, a FS grasping instrument 37 provided at the bottom face of the FS handling body 36 and having hooks 61 which are inserted into the holes for fuel support 7b shown in FIG. 3 and grasps the FS 7, positioning pins 38 provided at the bottom face of the FS handling body 36 which are inserted into the holes for fuel support 7b and position the FS handling part 22, a member 39 for detection of seating of the FS handling part 22 at the FS 7 having the same cruciform hole in its center as the FS handling body 36 and detecting that the FS handling part 22 is seated at the top face of the FS 7, and a sensor 39A for detection of seating of the FS handling part 22 at the FS 7 provided at the bottom face of the member 39. The FS grasping instruments 37 and the positioning pins 38 are provided in pairs, each pair of which are diagonally located, respectively. As shown in FIG. 11 by the sectional view in XIII—XIII direction of FIG. 9, the FS grasping instrument 37 comprises two FS hooks 61 respectively divided into two pieces the interval between which tapers downward, a FS hook support member 62 having cylindrical shape and provided at the bottom face of the member 39 for detection of seating the FS handling part 22 at the FS 7, an air cylinder 63 provided at the bottom face of the member 39 and inside the FS hook support member 62, and a shaft vertically moving by operation of the air cylinder 63. After the FS hooks 61 are inserted into the holes for fuel support 7b, the divided bottom parts of each FS hook 61 are spread out when the shaft 64 is lowered along the inside faces of each FS hook 61 tapering downward. Then the FS 7 is grasped by the spread bottom parts of the FS hooks 61. The member 39 for detection of seating of the FS handling part 22 at the FS 7 is connected to the FS handling body 36 at the top of which a projection part 39a is engaged into a connection cover 65 and has ability of some up-and-down motion by a bush 66 and a spring 67. When the member 39 for detection of seating of the FS handling part 22 at the FS is seated at the FS 7, the member 39 is pushed up and the projection part 39a goes up inside the connection cover 65 as pushing the spring 67. At the same time, the top face of the member 39 pushes the tip of the sensor 39A for detection of seating of the FS handling part 22 at the FS 7 which generates a signal of seating of the FS handling part 22 at the FS 7. A circuit not shown in a figure confirms that the FS handling part 22 is seated at the FS 7 by accepting the signal. The vertically moving part 23 comprises a pair of racks for vertical motion 40 penetrating the FS handling part 22 provided at the bottom of the fixing part 20, a pair of motors for vertical motion 41, and a pair of pinions for vertical motion 42 provided to the pair of motors 41, respectively. The rotating part 24 as shown in FIG. 12 partially by the sectional drawing and viewed in XIV direction of FIG. 9, comprises a rack for rotation 43, a member for rotation 44 connected to the bottom of the rack for rotation 43 and to the CR handling part 21, a motor for rotation 45 provided at the fixing part, and a pinion for rotation 44 gearing with the rack for rotation 43 attached to a shaft of the motor for rotation 45. The member for rotation 44 comprises two large radius of disks sandwiching a small disk in them and prevents itself from falling by engaging the member 44 into a circular hole provided at the top face of the lower part of the body 30 of the fixing part 20. The CR handling part 21, the FS handling part 22 and the vertically moving part 23 are rotated by the member for rotation 44 which is also rotated by the motor 45, the pinion 46 and the rack 43.

Figure 13:
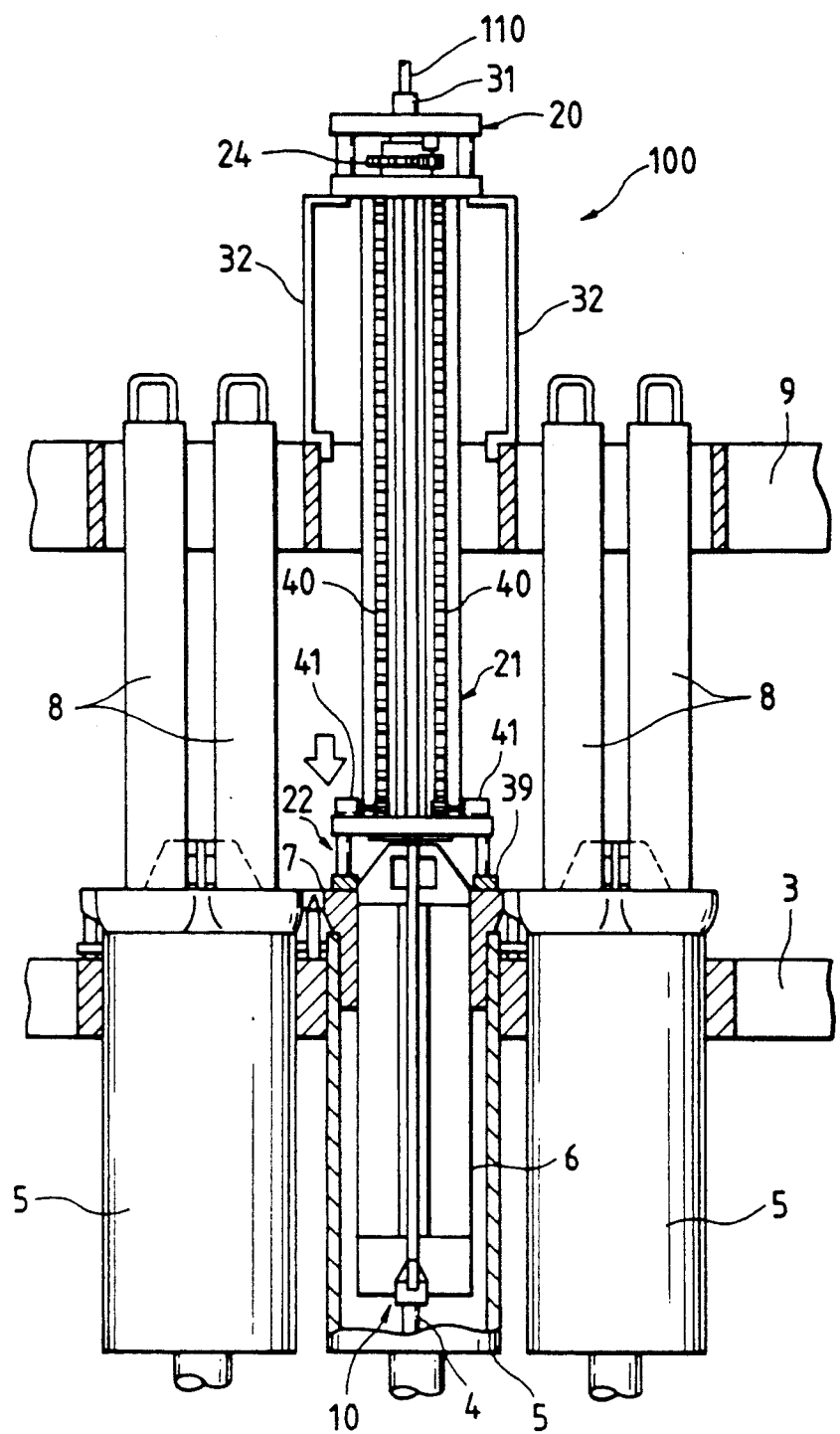
FIG. 13 is a drawing explaining process of getting down the control rod handling apparatus and lowering a fuel support piece handling part.
Figure 14:
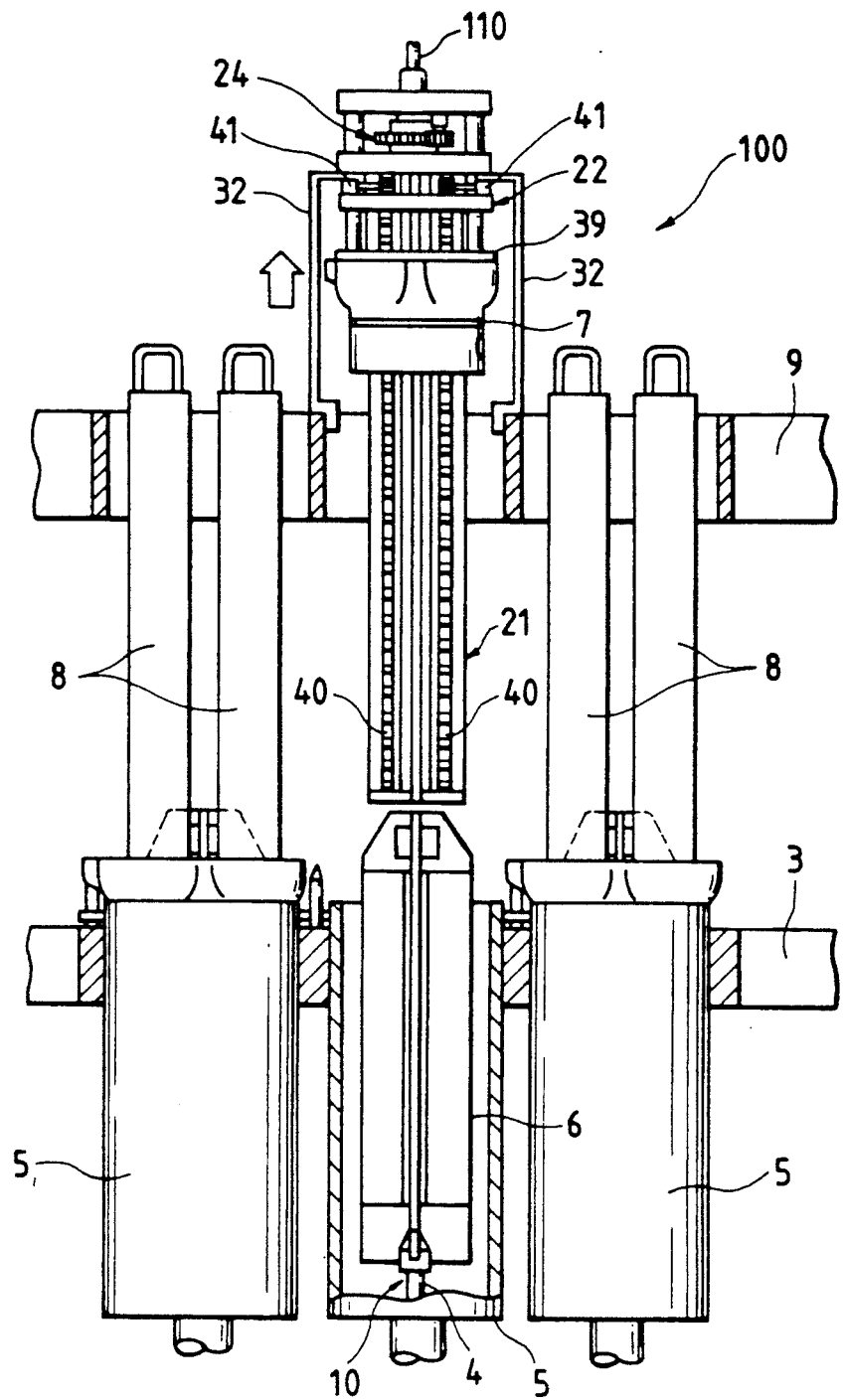
FIG. 14 is a drawing explaining process of taking off the fuel support piece.
Figure 15:
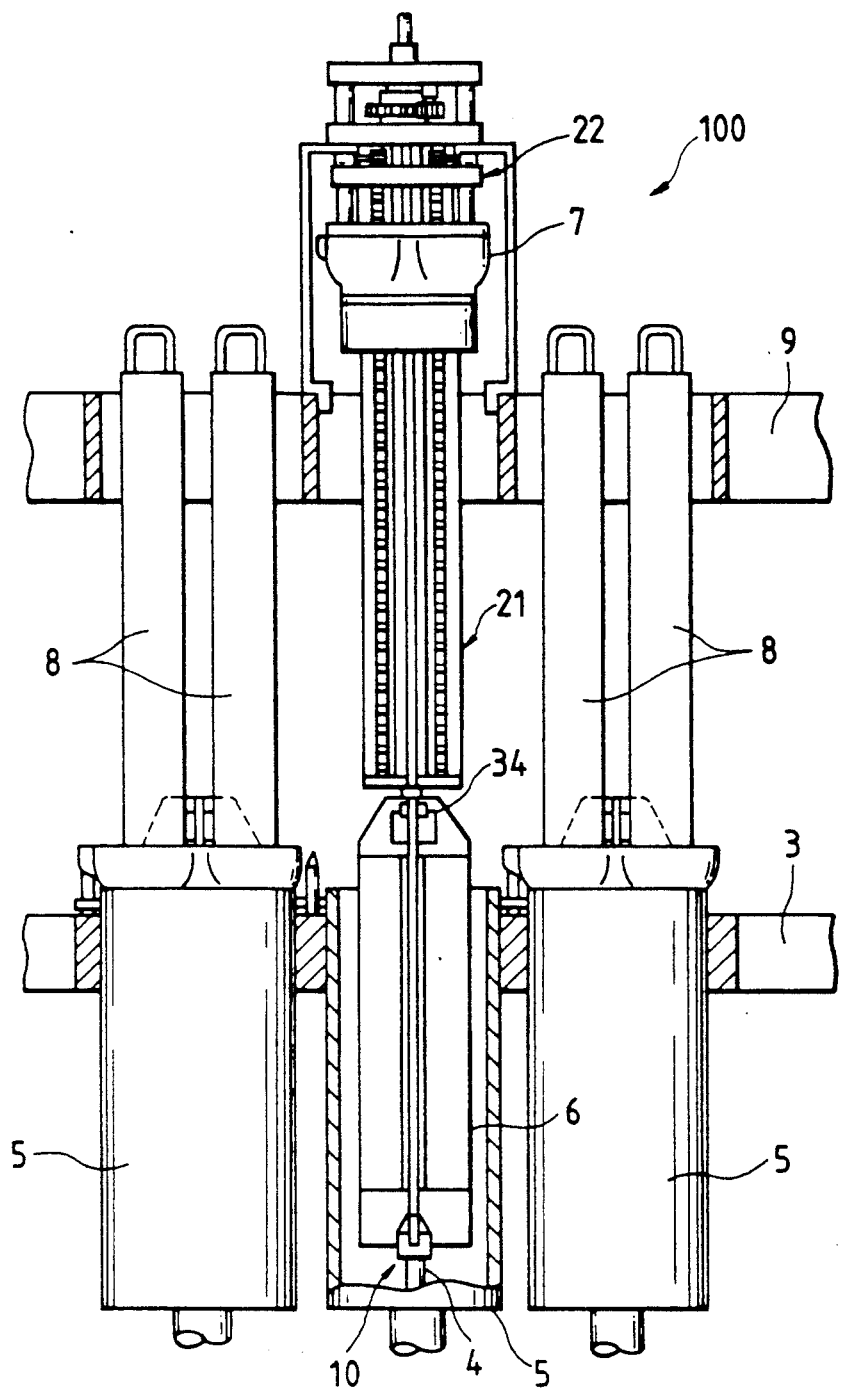
FIG. 15 is a drawing explaining process of grasping the control rod.
Figure 16:
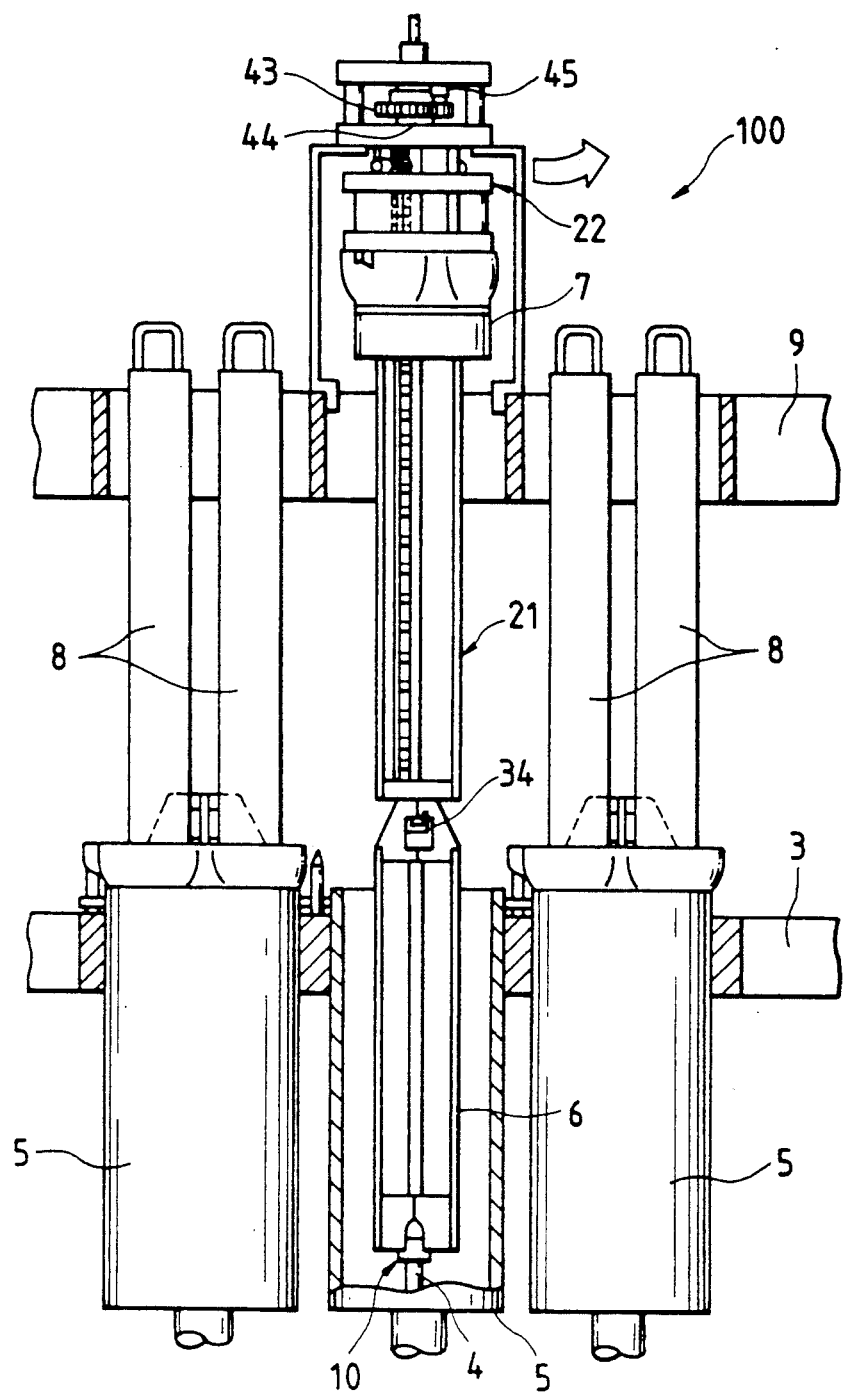
FIG. 16 is a drawing explaining process of disconnecting the connection by the bayonet coupling between the control rod and the control rod drive mechanism.
Figure 17:
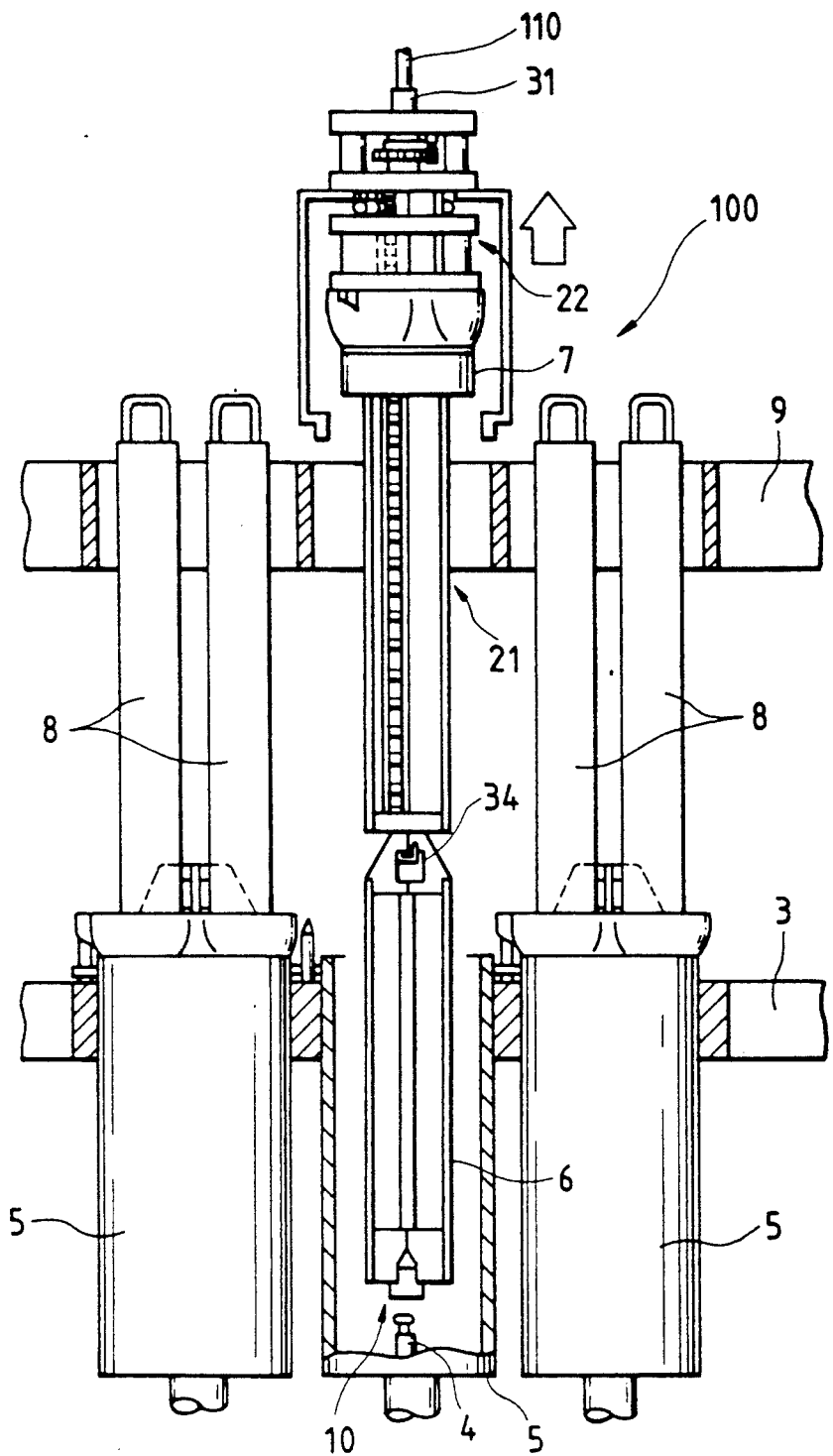
FIG. 17 is a drawing explaining process of lifting the control rod handling apparatus and taking out the control rod above the upper grid plate.

Next, a method as an embodiment for taking off the CR 6 corresponding to the step 106 of FIG. 7 by using the above-mentioned CR handling apparatus 100 is explained by referring to FIG. 13-17. The procedures of getting down the CR handling apparatus 100 and the FS handling part 22 are as follows. As shown in FIG. 13, the member for connection 31 is connected to the tip of the wire rope 110 hanged from the subsidiary hoist of the fuel exchange apparatus and the CR handling apparatus 100 is got down into the reactor core by unwinding the wire rope 110 with the subsidiary hoist. The motion of getting down the CR handling apparatus 100 is stopped when the bottoms of the guides 32 are seated at the top face of the upper grid plate 9. The FS handling part 22 is lowered to the FS 7 as shown by an arrow in FIG. 13 by using the motors 41, the pinions 42 and the racks 40 of the vertically moving part 23. And the motion of lowering the FS handling part 22 is stopped when the member 39 for detection of seating of the FS handling part 22 at the FS 7 is seated at the top face of the FS 7. At that time, the positioning of the FS handling part 22 to the FS 7 is done by inserting the positioning pins 38 diagonally allocated at the bottom face of the FS handling body 36 into the holes for fuel support 7b. The procedures of taking of the FS 7 are as follows. After the FS 7 is grasped by the FS grasping instrument 37 diagonally provided at the bottom face of the FS handling body 39, the FS handling part 22 is lifted above the upper grid plate 9 as shown by an arrow in FIG. 14, by operating the vertically moving part 23. In the procedures, since the horizontal direction of the FS 7 is kept as originally positioned, the FS 7 does not interfere with the upper grid plate 9 in taking off the FS 7 through the upper grid plate 9. The procedures of grasping the CR 6 and disconnecting the connection of the bayonet coupling are as follows. As shown in FIG. 15, the CR 6 is grasped by operating the CR grasping instrument 34. And, as shown in FIG. 16, the connection of the bayonet coupling between the CR 6 and the CRD 4 is disconnected by rotating the CR handling part 21, the FS handling part 22 and the vertically moving part 23 together by 45 degrees, by operating the rotating part 24. The procedures of taking out the CR 6 above the upper grid plate 9 are as follows. As shown in FIG. 17, the CR handling apparatus 100 grasping the FS 7 and the CR 6 is lifted by winding the wire rope 110 with the subsidiary hoist of the fuel exchange apparatus, and the CR 7 is taken out from the reactor core apart from the CRD 4. By the above-mentioned procedure, the CR taking out work comprising the steps of taking off the FS 7, disconnecting the CR 6 and the CRD 4 and taking out the CR is completed. And the step 107 of attaching a new CR as shown in FIG. 7 can be done by the reverse procedures to the above-mentioned procedures for taking out the CR 6 and the FS 7.

Figure 18:
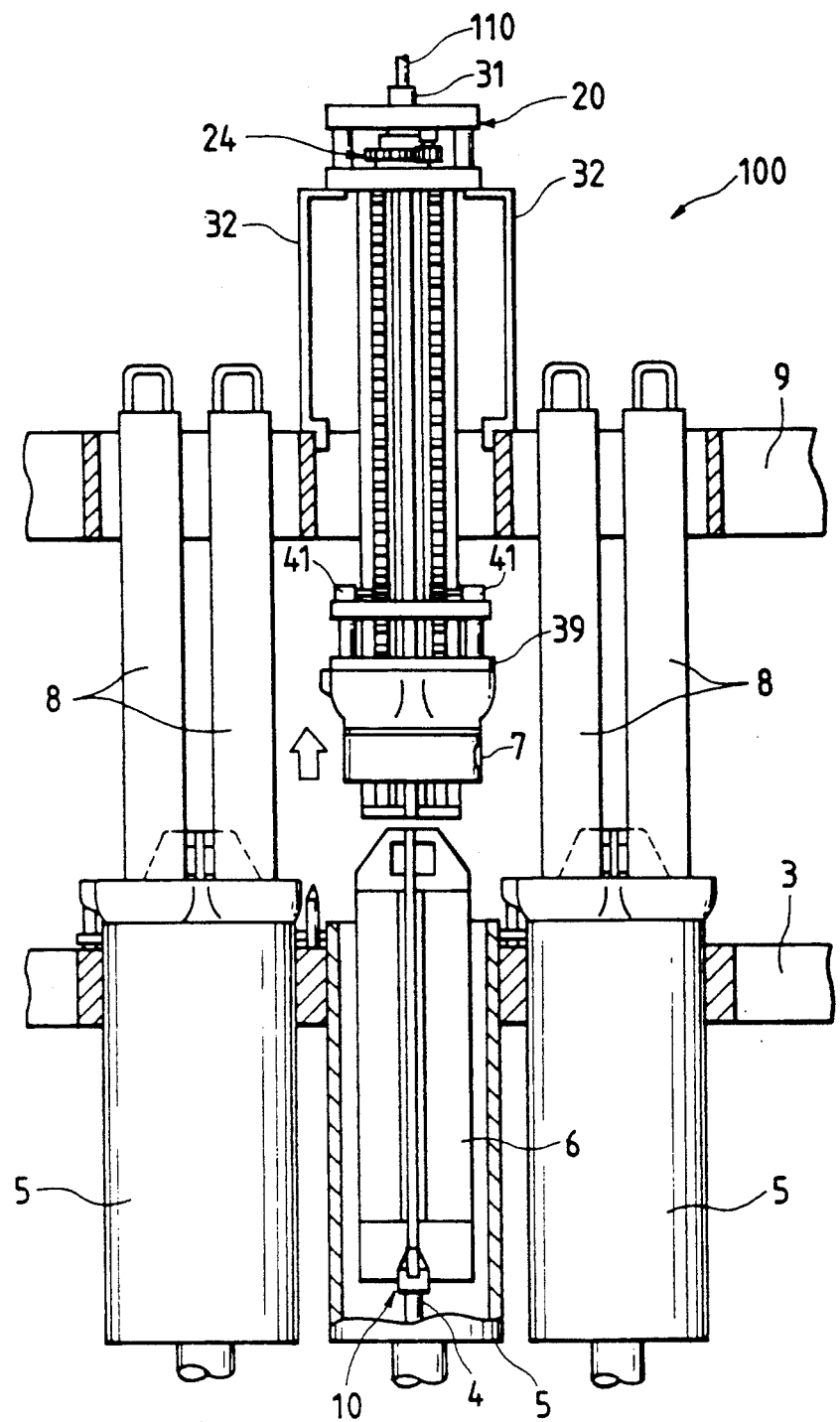
FIG. 18 is a drawing explaining process of taking off the fuel support piece by another method for handling the control rod, of an embodiment based on the present invention.
Figure 19A:
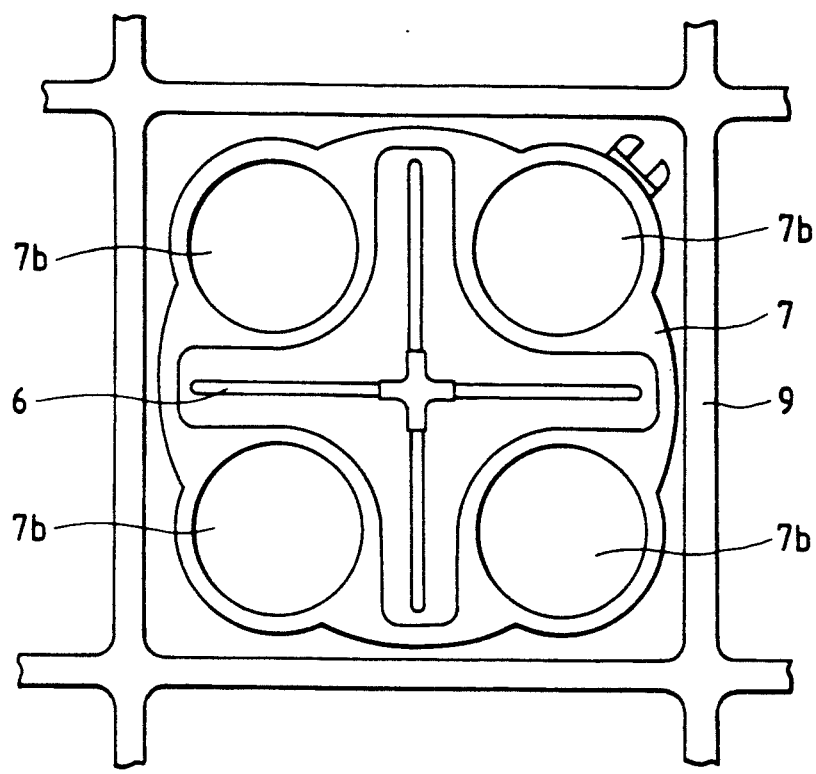
FIG. 19(a) and 19(b) are plane figures of the upper grid plate viewed from above, showing the relation of horizontal directions between the fuel support piece and the upper grid plate.
Figure 19B:
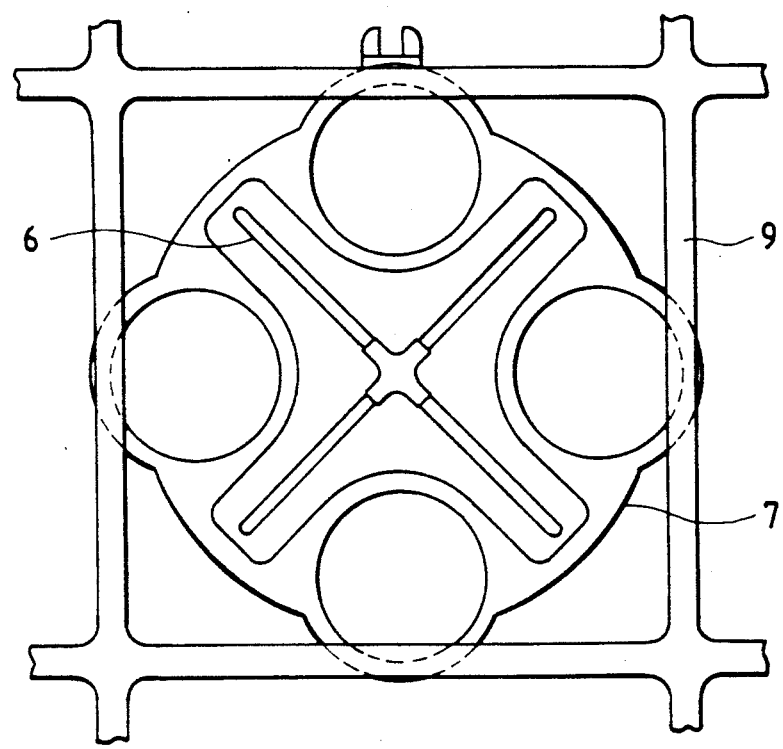
Figure 20:
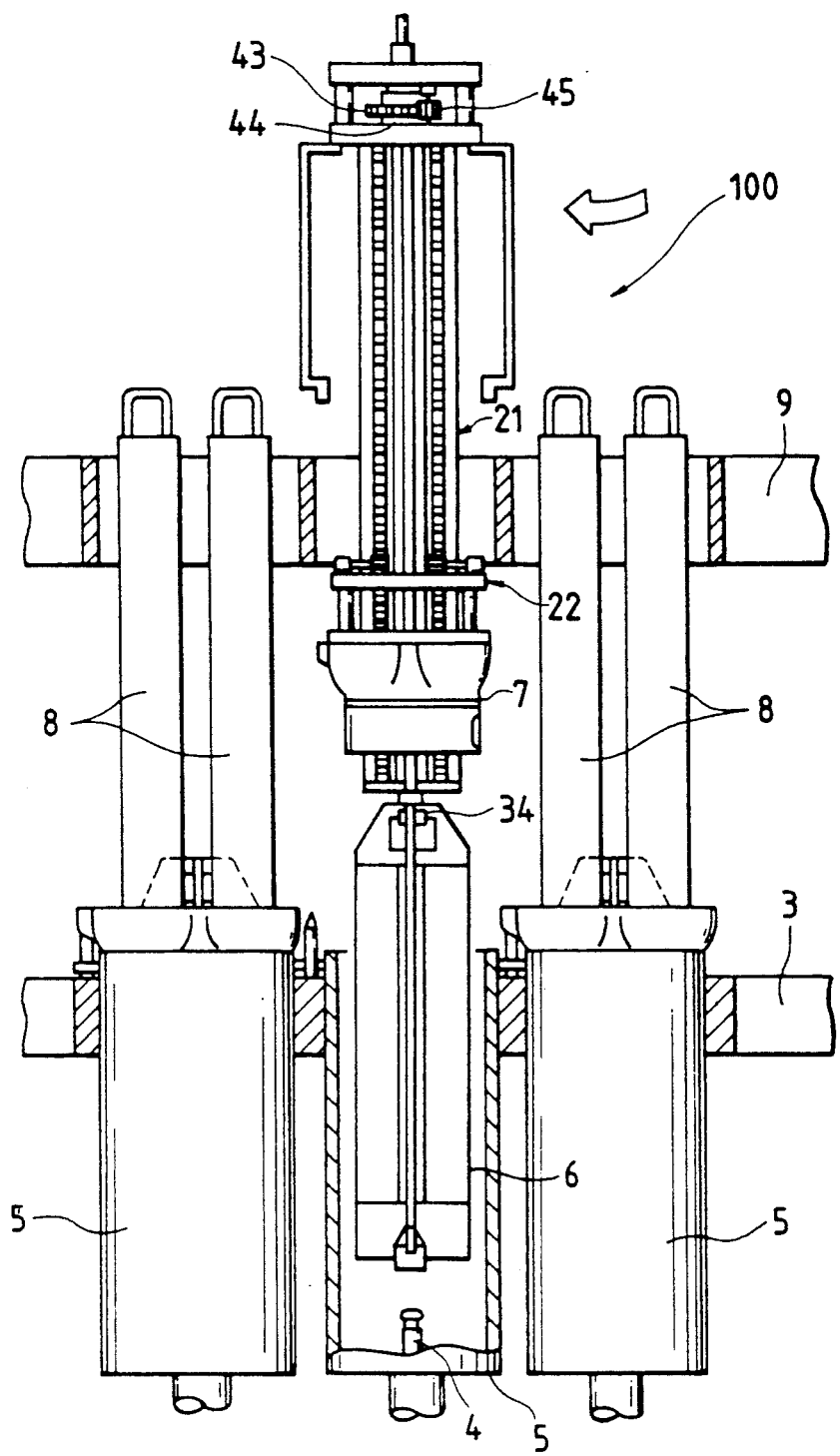
FIG. 20 is a drawing explaining process of reverse rotation to the rotation shown in FIG. 19(b) of the control rod handling part and the fuel support piece handling part.

Next, an another method as an embodiment for taking off a CR 6 by using of the above-mentioned CR handling apparatus 100 is explained by referring to FIGS. 18-20. The procedures of getting down the CR handling apparatus 100 and lowering the FS handling part 22 are the same procedures as the previous method. After the procedures, the FS 7 is taken off and lifted by the position below the upper grid plate 9 as shown in FIG. 18. And the CR handling part 21, the FS handling part 22 and the vertically moving part 23 are rotated by 45 degrees, then the connection by the bayonet coupling between the CR 6 and the CRD 4 is disconnected. The CR handling apparatus 100 grasping the FS 7 and the CR 6 is lifted by winding the wire rope 110 with the subsidiary hoist of the fuel exchange apparatus and stopped when the top part of the FS handling part 22 reaches the position right bellow the upper grid plate 9. The reason why lifting the CR handling apparatus is stopped at the position is explained as follows. FIG. 19(a) and 19(b) are figures of the FS 7 and the upper grid plate 9 viewed from above. As shown in FIG. 19(a), the FS 7 does not interfere with the upper grid plate 9 when the horizontal direction of the FS 7 is kept as originally positioned. In the second method for handling the CR 6, since the FS 7 is also rotated by 45 degrees in rotating the CR 6, the CR handling part 21 and the FS handling part 22 for disconnecting the CR 6 and the CRD 4, passing the FS 7 rotated by 45 degrees through the upper grid plate 9 is obstructed by interference between the FS 7 and the upper grid plate 9 as shown in FIG. 19(b). In order to avoid the interference, before passing the FS 7 through the upper gird plate 9, the FS 7 is rotated by 45 degrees in the reverse direction to the first rotation, as shown in FIG. 20. In the first method for handling the CR 6, before rotating the CR 6 for disconnecting the connection, the FS 7 is taken out above the upper grid plate 9. Therefore, the above-mentioned interference does not arise. The procedures of taking out the FS 7 and the CR 6 above the upper rid plate 9 are as follows. The FS handling part 22 is lifted above the upper grid plate 9. And the CR handling apparatus 100 grasping the FS 7 and the CR 6 is lifted by winding the wire rope 110 with the subsidiary hoist of the fuel exchange apparatus and then the CR 6 is taken out above the upper gird plate 9. By the above-mentioned procedures, the CR taking out work comprising the steps of taking off the FS 7, disconnecting the connection of the CR 6 and the CRD 4 and taking out the CR 6 is completed. And attaching a new CR can be done by the reverse procedures to the above-mentioned procedures for taking out the CR 6.

As has been explained in the foregoing, according to the present invention, taking off the FS disconnecting the connection by the bayonet coupling between the CR and the CRD and taking out the CR from the reactor core are continuously implemented without any change of reactor core structures, which considerably shorten the time for the CR exchange.

What is claimed is:

1. A control rod handling apparatus for exchanging a control rod connected to a control rod drive mechanism by bayonet coupling in a nuclear reactor, which comprises:

a member for connection attached to a fuel exchange apparatus, a fixing part having guides to be seated at the top face of an upper grid plate in a reactor vessel and to be supported by the upper grid plate, a body provided at the lower part of said fixing part, a control rod handling part having a control rod grasping instrument provided at the bottom part of said body, a fuel support piece handling part having a fuel support piece grasping instrument and means for positioning said fuel support piece grasping instrument which is provided outside said control rod handling part, means for vertically moving said fuel support piece handling part along with the outside of said control rod handling part, and means for rotating said control rod handling part, said fuel support piece handling part and said means for vertical motion.

2. A control rod handling apparatus for exchanging a control rod connected to a control rod drive mechanism by bayonet coupling in a nuclear reactor, which comprises:

a member for connection attached to a fuel exchange apparatus, a fixing part having guides to be seated at the top face of an upper grid plate in a reactor vessel and to be supported by the upper grid plate, a body having cruciform section provided at the lower part of said fixing part, a control rod handling part having a control rod grasping instrument provided at the bottom part of said body, a fuel support piece handling part having a fuel support piece grasping instrument and means for positioning said fuel support piece grasping instrument which is provided outside said control rod handling part, means for vertically moving said fuel support piece handling part along with the outside of said control rod handling part, and a means for rotating said control rod handling part, said fuel support piece and said means for vertical motion.

3. A control rod handling method for disconnecting a control rod and a control rod drive mechanism connected to each other by bayonet coupling, and taking off said control rod and a fuel support piece in control rod exchange work of a nuclear reactor, which, by using said control rod handling apparatus comprising a fixing part having guides to be seated at the top face of an upper grid plate and to be supported by the upper grid plate, a control rod handling part having a control rod grasping instrument, a fuel support piece handling part having a fuel support piece grasping instrument, means for vertically moving said fuel support piece handling part and means for rotating said control rod handling part, said fuel support piece handling part and said means for vertical motion, comprises the steps of:

getting down said control rod handling apparatus, seating said fixing part at the upper grid plate, lowering said fuel support piece handling part, seating the bottom part of said fuel support piece handling part at the top face of said fuel support piece, positioning said fuel support piece grasping instrument, grasping the fuel support piece, lifting the fuel support piece above the upper grid plate, grasping said control rod, rotating said control rod handling part grasping said control rod and said fuel support piece handling part grasping the fuel support piece by a predetermined angle, disconnecting the connection between said control rod and said control rod drive mechanism, and taking out said control rod and said fuel support piece above the upper grid plate.

4. A control rod handling method for coupling a control rod and a control rod drive mechanism by bayonet coupling, and attaching said control rod and a fuel support piece in control rod exchange work of a nuclear reactor, which, by using said control rod handling apparatus comprising a fixing part having guides to be seated at the top face of an upper grid plate and to be supported by the upper grid plate, a control rod handling part having a control rod grasping instrument, a fuel support piece handling part having a fuel support piece grasping instrument, means for vertically moving said fuel support piece handling part and means for rotating said control rod handling part, said fuel support piece handling part and said means for vertical motion, comprises the steps of:

attaching said fuel support piece to said fuel support piece grasping instrument, attaching said control rod to said control rod grasping instrument, getting down said control rod handling apparatus attached to a fuel exchange apparatus, seating said fixing part at the upper grid plate, inserting the control rod into the connection part of said control rod drive mechanism, rotating said control rod handling part grasping the control rod and said fuel support piece handling part grasping said fuel support piece by a predetermined angle, coupling said control rod and said control rod drive mechanism, lowering and fixing said fuel support piece to a reactor core support plate, loosing said control rod and said fuel support piece from said control rod handling apparatus, and taking out said control rod handling apparatus above the upper grid plate.

5. A control rod handling method for disconnecting the connection between a control rod and a control rod drive mechanism connected to each other by bayonet coupling, and taking off said control rod and a fuel support piece in control rod exchange work of a nuclear reactor, which, by using said control rod handling apparatus comprising a fixing part having guides to be seated at the top face of an upper grid plate and to be supported by the upper grid plate, a control rod handling part having a control rod grasping instrument, a fuel support piece handling part having a fuel support piece grasping instrument, means for vertically moving said fuel support piece handling part and means for rotating said control rod handling part, said fuel support piece handling part and said means for vertical motion, comprises the steps of:

getting down said control rod handling apparatus attached to a fuel exchange apparatus, seating the fixing part at the upper grid plate, lowering said fuel support piece handling part, seating the bottom part of said fuel support piece handling part at the top face of the fuel metal support piece, positioning said fuel support piece grasping instrument, grasping said fuel support piece and lifting it above the top part of said control rod, grasping said control rod, and rotating said control rod handling part grasping said control rod and said fuel support piece handling part grasping said fuel support piece by a predetermined angle, disconnecting the connection between said control rod and said control rod drive mechanism, lifting said fuel support piece handling part by the position below the upper grid plate, rotating said control rod handling part and said fuel support piece handling part reversely to the above-mentioned rotation by the predetermined angle, and taking out said control rod and said fuel support piece above the upper grid plate.

6. A control rod handling method for coupling a control rod and a control rod drive mechanism by bayonet coupling, and attaching said control rod and a fuel support piece in control rod exchange work of a nuclear reactor, which, by using said control rod handling apparatus comprising a fixing part having guides to be seated at the top face of an upper grid plate and to be supported by the upper grid plate, a control rod handling part having a control rod grasping instrument, a fuel support piece handling part having a fuel support piece grasping instrument, means for vertically moving said fuel support piece handling part and means for rotating said control rod handling part, said fuel support piece handling part and said means for vertical motion, comprises the steps of:

attaching said fuel support piece to said fuel support piece grasping instrument, attaching said control rod to said control rod grasping instrument, getting down said control handling apparatus attached to a fuel exchange apparatus, seating said fixing part at the upper grid plate, lowering said fuel support piece by the position below the upper grid plate, rotating said control rod handling part grasping the control rod and said fuel support piece handling part grasping said fuel support piece by a predetermined angle, inserting said control rod into the connection part of said control rod drive mechanism, rotating said control rod handling part grasping said control rod and said fuel support piece handling part grasping said fuel support piece reversely to the above-mentioned rotation by the predetermined angle, coupling said control rod and said control rod drive mechanism, lowering and fixing said fuel support piece to a reactor core support plate, loosing said control rod and said fuel support piece from said control rod handling apparatus, and taking out said control rod handling apparatus above the upper grid plate.

* * * * *